United States Patent [19]
Lemire et al.

[11] Patent Number: 5,160,119

[45] Date of Patent: Nov. 3, 1992

[54] SLIDE PLATE ADJUSTABLE ORIFICE

[76] Inventors: Robert J. Lemire; John J. Hannick, both of P.O. Box 299, Kings Park, N.Y. 11754

[21] Appl. No.: 778,523

[22] Filed: Oct. 18, 1991

[51] Int. Cl.⁵ .................. F16K 3/32; F16K 31/50
[52] U.S. Cl. .................. 251/212; 251/205; 138/94.3
[58] Field of Search .............. 251/212, 205; 138/94.3

[56] References Cited

U.S. PATENT DOCUMENTS 2,810,394  10/1957  Ferguson .............. 251/212 X
4,193,574  3/1980   Barnes et al. .......... 251/212 X
4,957,139  9/1990   Gwin et al. ........... 251/212 X Primary Examiner—Arnold Rosenthal

[57] ABSTRACT

An adjustable orifice comprising two half plates movable with respect to one another with adjusting holes for positioning the plates and flanges for holding the half plates in position.

3 Claims, 5 Drawing Sheets

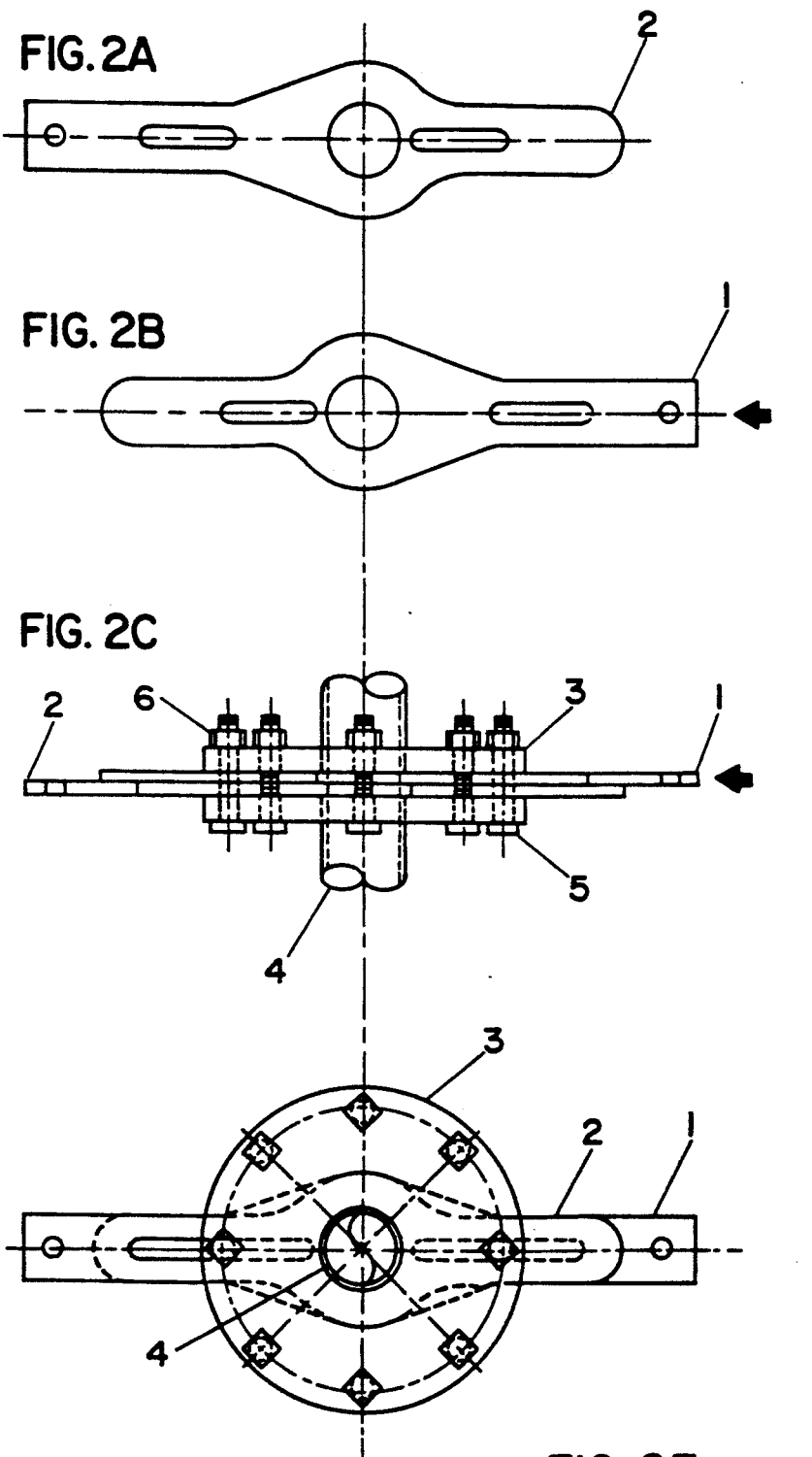

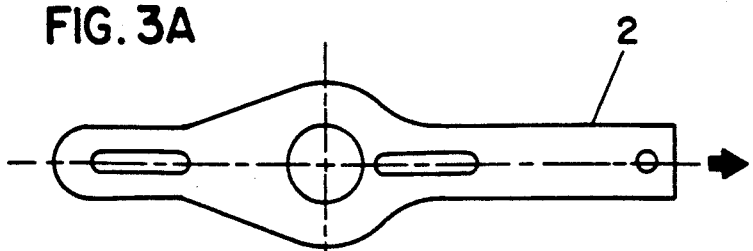
FIG. 3A
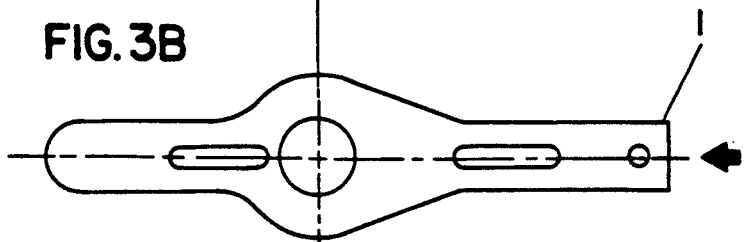
FIG. 3B
FIG. 3C
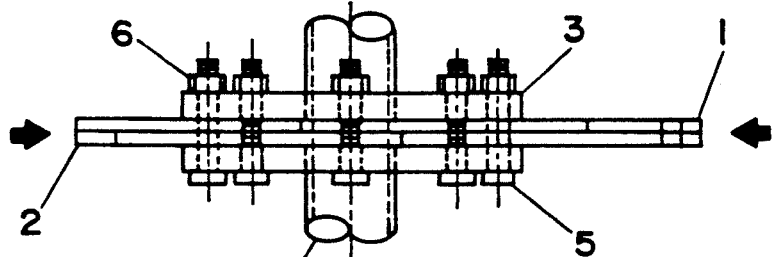
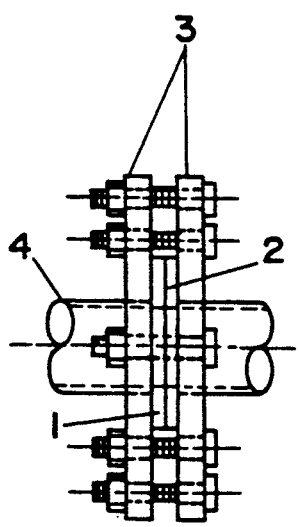
FIG. 3D
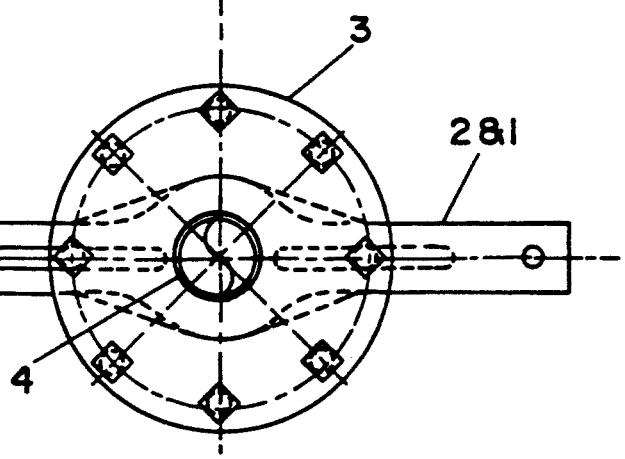
FIG. 3E

SLIDE PLATE ADJUSTABLE ORIFICE

SUMMARY

In many fluid piping systems the operators are required to periodically alter the flowing conditions. The device they normally use is a valve that is either partially opened or partially closed to regulate the flow to the new desired condition. Quite often the valve is installed to be adjusted infrequently or only for initial adjustments, and is used to fine tune the system flow. The slide plate adjustable orifice can be used in the place of a valve and function over the full range of flows similar to a valve. However, in the fully open position the slide plate adjustable orifice has a very small pressure drop.

The slide plate adjustable orifice is primarily composed of two similar, gasket coated or impregnated, half plates that are mounted between two piping flanges. The half plates each have two slotted bolt holes and a central fluid hole. The central fluid hole matches the pipe size that it is installed in. The half plates are designed so that the slotted holes are offset in relation to the fluid hole and one side is longer than the other. The half plates are usually installed one on top of the other so that the longer side of the half plates are opposite one another. With this arrangement the plates are installed in their full open position when the longer sides are either both retracted, or both inserted. By pushing in, or pulling out one or both of the half plates the operators can gradually close off the flow opening formed by the two half plates. This gradual moving of the fluid holes in the half plates creates a closing off of the flow area and is the feature that makes this device an adjustable orifice.

In another configuration the adjustability is provided by having both long ends together and pushing in one half plate while the other is pulled out. This produces the closing off of the flow area by again having the fluid holes moving in opposite directions.

BRIEF DESCRIPTION OF THE DRAWING

The nature of the invention may be better understood by way of example with reference to the accompanying drawings, which illustrate some of the preferred embodiments, in which:

FIG. #1 is a drawing showing a basic design for pull out half plates and how they are installed between two oversized flanges such that they are closed off by a pulling action on the flat extended end.

Figure 1A:
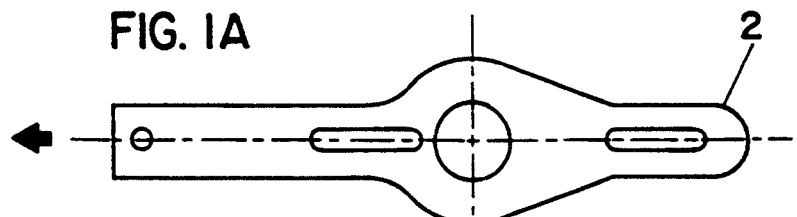
Figure 1B:
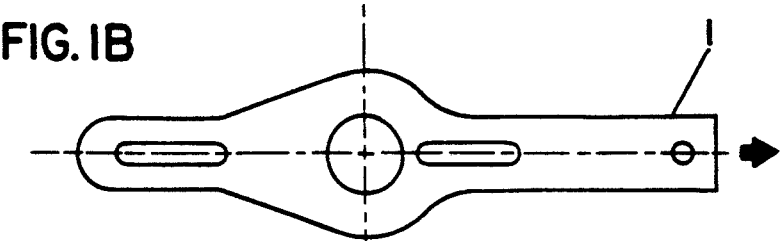
Figure 1C:
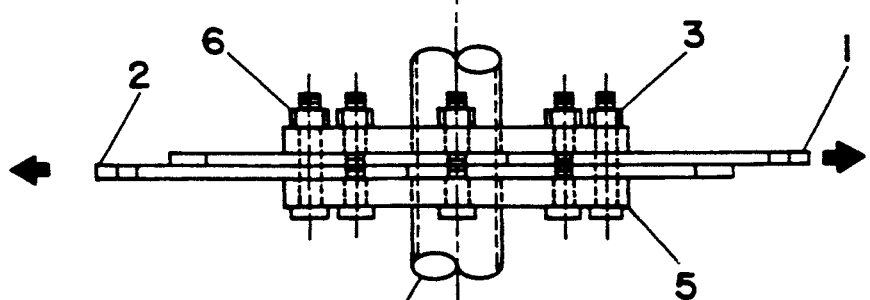
Figure 1D:
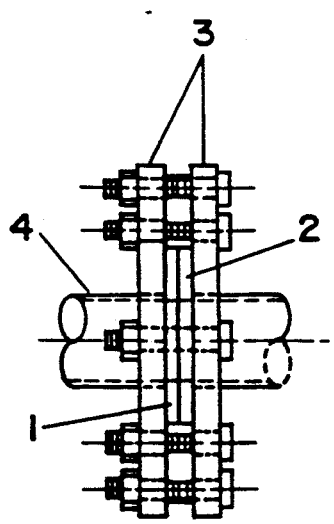
Figure 1E:
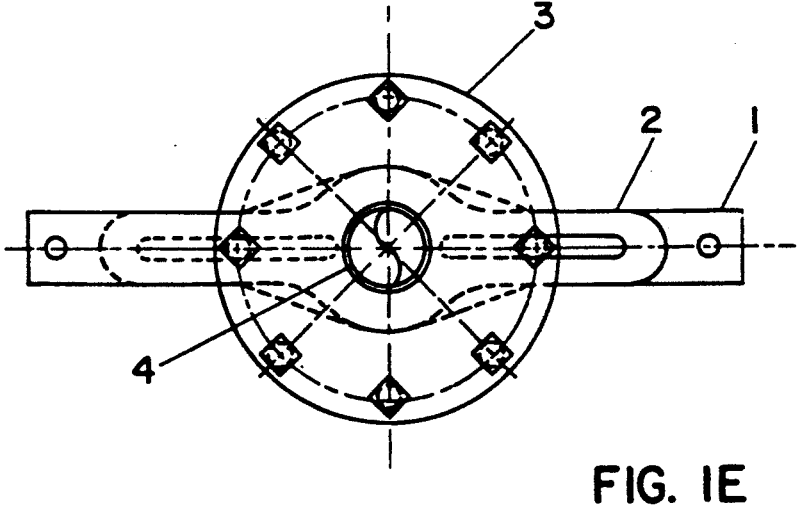
Figure 4A:
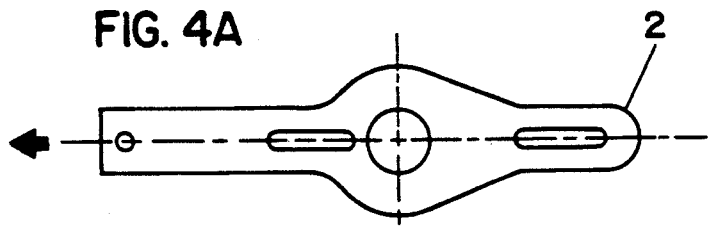
Figure 4B:
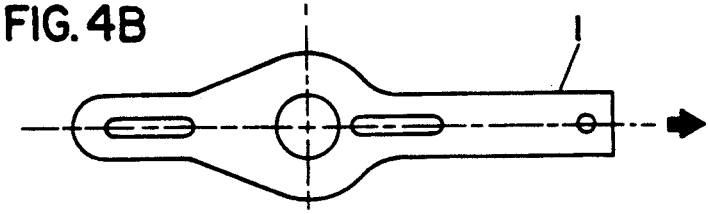
Figure 4C:
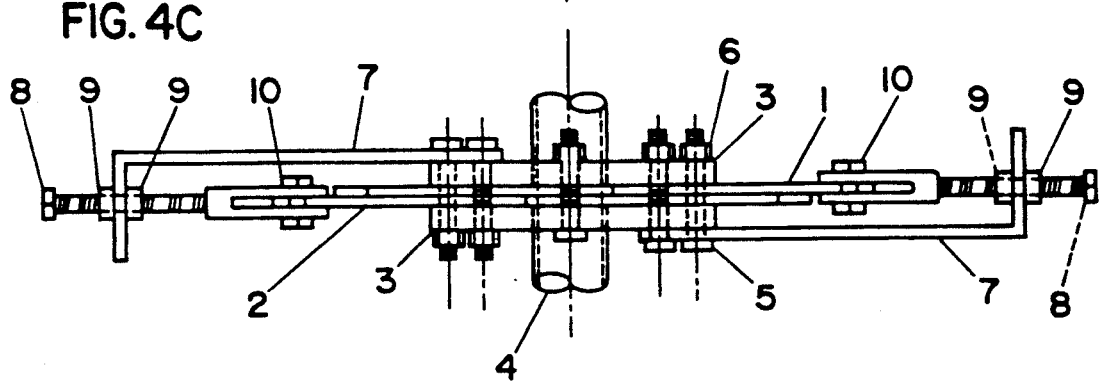
Figure 4D:
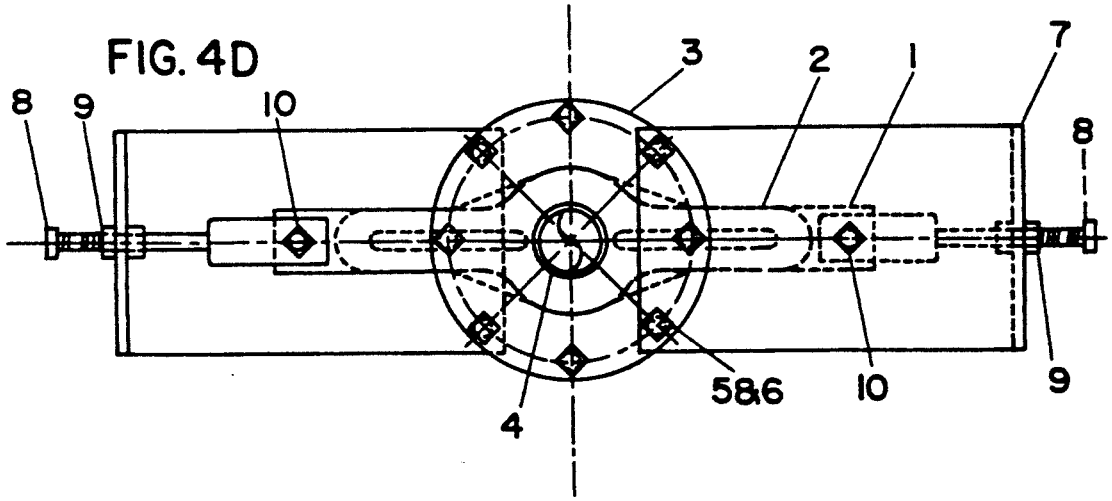
Figure 5A:
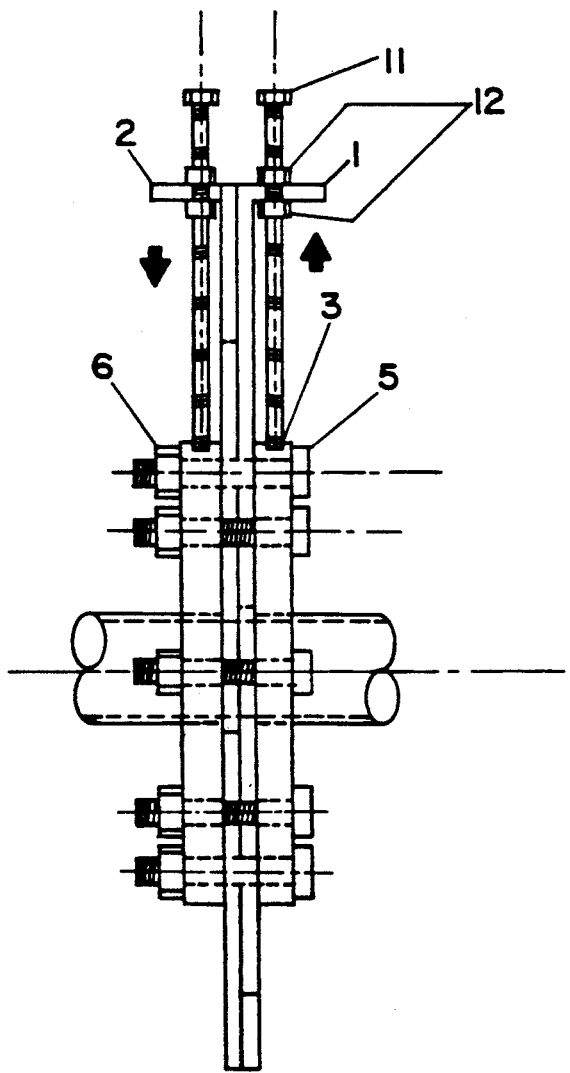
Figure 5B:
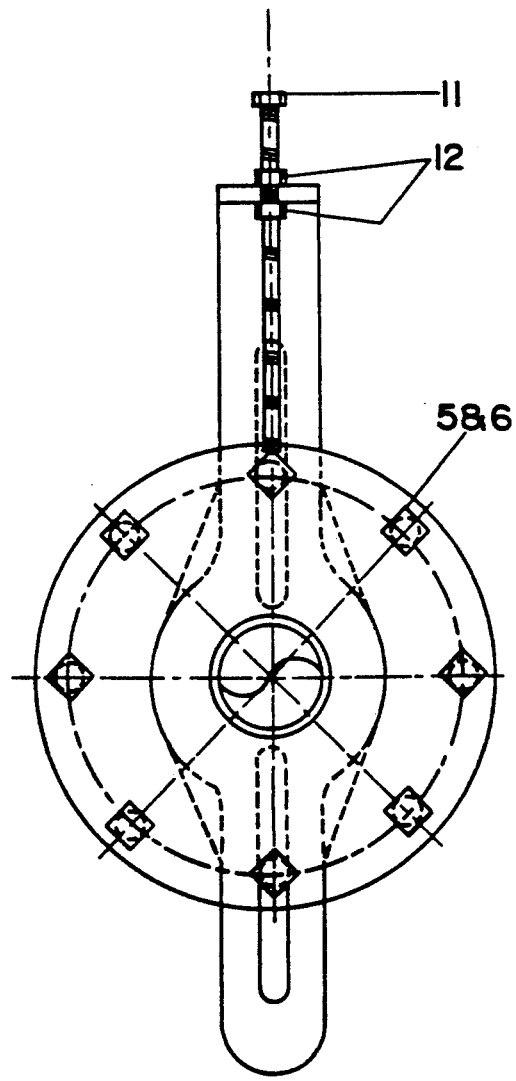

FIG. #2 is a drawing showing a basic design for push half plates and how they are installed between two oversized flanges such that they are closed off by a pushing action on the flat extended end.

FIG. #3 is a drawing showing a basic design for push/pull half plates and how they are installed between two oversized flanges such that they are either pushed or pulled from the same side of the flange by action on the flat extended ends.

FIG. #4 is a drawing showing the half plates between flanges with a bracket and adjusting bolt connected through each half plate's adjusting hole.

FIG. #5 is a drawing showing the half plates between flanges with jacking bolts through the alignment or adjusting holes of the half plates.

DETAILED DESCRIPTION

In the preferred form of the invention presented in the accompanying drawings, the slide plate adjustable orifice is composed of two specially designed half plates 1&2 that have identical fluid holes and two elongated bolt holes that are located on each plate such that they permit movement of the plates relative to one another so that the fluid holes gradually move away from the center of the flange 3 fluid hole and thereby restrict the passage of any fluid or material through the pipe 4. The half plates 1&2 are installed such that they are held in position between the flanges 3 by two opposite bolts 5 that fasten the flanges together with corresponding nuts 6. The half plates 1&2 are designed so that they will have adequate sealing surface between themselves over the full range of their respective movements. The flanges 3 are also oversized to permit the movement of the half plates 1&2 and also provide adequate sealing surface with respect to the half plates 1&2. These embodiments are shown in FIGS. #1, #2, & #3; whereby FIG. #1 shows the design for half plates 1&2 that are pulled out from their full open position. FIG. #2 shows the design of half plates 1&2 that are pushed in from their full open position. FIG. #3 shows the design of half plates 1&2 that are pushed and pulled relative to one another from the same side of the flange 3.

In FIG. #4 two adjusting brackets 7 are attached to the flanges 3 with two jacking bolts 8, each bolt 8 with two jacking nuts 9 and a retaining pin or bolt 10 securing the jacking 8 bolts to each half plate 1&2. With this embodiment the half plates 1&2 are held in position and move by the action of the jacking nuts 9 against the adjusting brackets 7.

In FIG. #5 the half plates 1&2 are bent such that their alignment or adjusting holes are at right angles to the plates and have jacking bolts 11 with nuts 12 on both sides of the half plates 1&2 inserted through the adjusting holes. The jacking bolts are screwed and fastened into threaded holes provided in the flanges 3. With this embodiment the half plates 1&2 are held in position and move by the action of the nuts 12 as they are positioned on the jacking bolts 11.

In each one of these embodiments the movement of the half plates 1&2 with respect to one another and the flanges 3 provides a means for changing the open flow area created between the two half plates 1&2. This action in effect creates a adjustable orifice that has a infinite number of positions from full open to full closed for controlling the flow of material through the device.

What we claim is:

1. Apparatus for controlling the flow of fluids or other materials in piping or conveying systems which comprises:
    (a) two specially designed half plates, which may be coated or impregnated with a sealing material, each having a fluid hole, an alignment or adjusting hole for positioning the half plates, two slotted bolt holes arranged such that the two half plates, when placed face to face and inserted between flanges, can be aligned such that the fluid holes are either lined up with the center of the flange hole or are offset in opposite directions so as to partially or fully close off the available flowing area formed by the two half plates, while also providing adequate sealing over the full range of the half plate movements;

(b) two oversized flanges, which may be coated or impregnated with a sealing material, each having appropriate numbers of bolt holes, fastening devices, fluid hole, and adequate sealing surface within the inner bolt circle to accommodate the full range of movement of the two half plates.

2. Apparatus for controlling the flow of fluids or other materials in piping or conveying systems which comprises:
   (a) two specially designed half plates, which may be coated or impregnated with a sealing material, each having a fluid hole, an alignment or adjusting hole for positioning the half plates, two slotted bolt holes arranged such that the two half plates, when placed face to face and inserted between flanges, can be aligned such that the fluid holes are either lined up with the center of the flange hole or are offset in opposite directions so as to partially or fully close off the available flowing area formed by the two half plates, while also providing adequate sealing over the full range of the half plate movements;
   (b) two oversized flanges, which may be coated or impregnated with a sealing material, each having appropriate numbers of bolt holes, fastening devices, fluid hole, and adequate sealing surface within the inner bolt circle to accommodate the full range of movement of the two half plates;
   (c) two adjusting brackets that are mounted on the outside of the flanges and provided with a hole for jacking bolts which each have two jacking nuts and are attached to their respective half plate with a retaining pin or bolt through the half plate adjusting hole that are used to adjust the position of the half plates.

3. Apparatus for controlling the flow of fluids or other materials in piping or conveying systems which comprises
   (a) two specially designed half plates, which may be coated or impregnated with a sealing material, each having a fluid hole, an alignment or adjusting hole that is perpendicular to the half plate main body for positioning the half plates, two slotted bolt holes arranged such that the two half plates, when placed face to face and inserted between flanges, can be aligned such that the fluid holes are either lined up with the center of the flange hole or are offset in opposite directions so as to partially or fully close off the available flowing area formed by the two half plates, while also providing adequate sealing over the full range of the half plate movements;
   (b) two oversized flanges, which may be coated or impregnated with a sealing material, each having appropriate numbers of bolt holes, fastening devices, fluid hole, threaded jacking bolt hole, and adequate sealing surface within the inner bolt circle to accommodate the full range of movement of the two half plates;
   (c) two threaded jacking bolts with four adjusting and locking nuts that are inserted through the alignment or adjusting hole in the half plates, with a nut on both sides of the half plate, and fastened and secured into the threaded jacking bolt holes provided in the flanges and are used for adjusting the position of the half plates.

* * * * *